May 2, 1950     F. T. COURT     2,506,443
CULTIVATOR TOOTH RELEASING MEANS
Filed Jan. 8, 1945
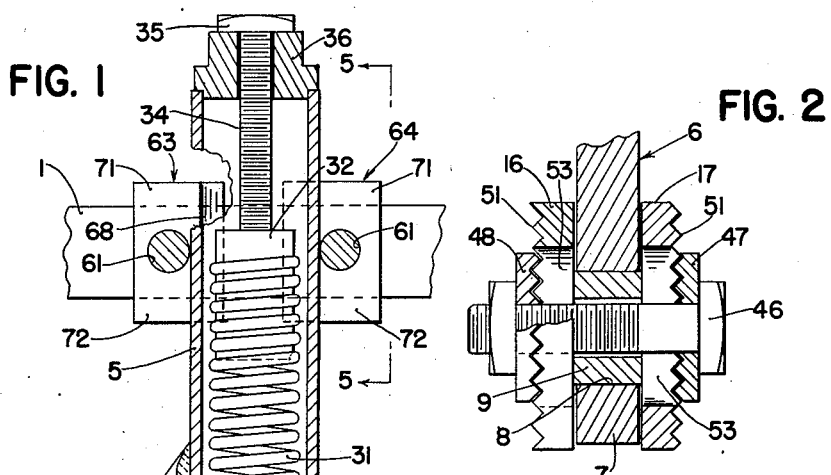
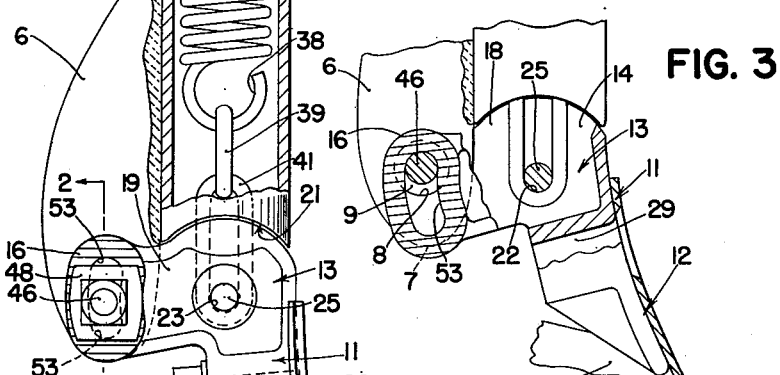
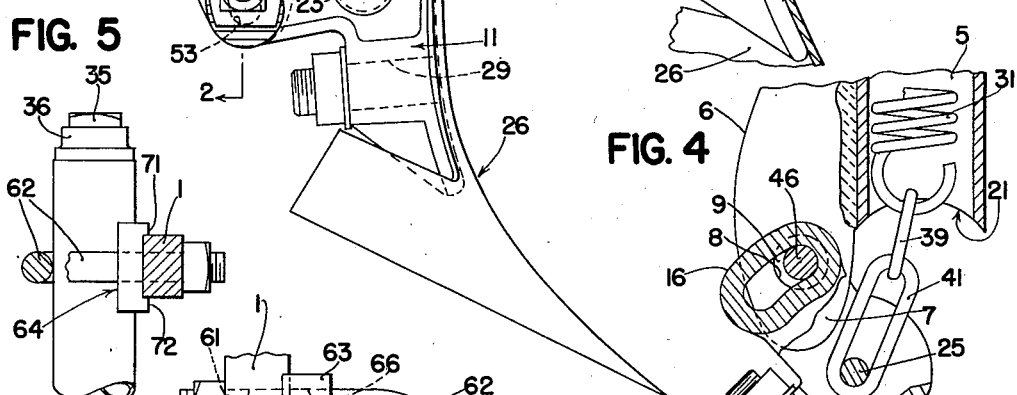
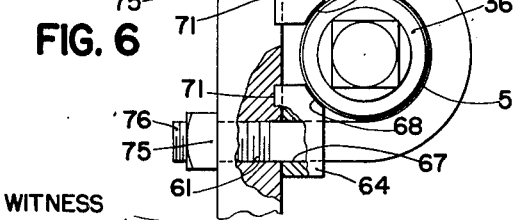
INVENTOR.
FRANK T. COURT
BY
ATTORNEYS
WITNESS
E. B. Bjurstrom Patented May 2, 1950

2,506,443

UNITED STATES PATENT OFFICE 2,506,443

CULTIVATOR TOOTH RELEASING MEANS

Frank T. Court, Moline, Ill., assignor to Deere & Company, Moline, Ill., a corporation of Illinois Application January 8, 1945, Serial No. 571,800

7 Claims. (Cl. 97—184)

1

The present invention relates generally to agricultural implements and more particularly to cultivators.

The object and general nature of the present invention is the provision of a new and improved spring mounting for cultivator shovels and other tools. More particularly, it is a feature of this invention to provide a combined shank and spring mounting for cultivator shovels and, additionally, a new and improved means for clamping the shank to a tool beam or other support.

Another important feature of the present invention is the provision of a cultivator shovel mounting of the spring trip type in which the spring parts are entirely enclosed and protected from dust, dirt and the like and in which adjustments of the cultivator tool may be made without affecting the spring action of the mounting. Another feature of the present invention is the provision of combined cultivator shank and spring mounting which is materially lighter in weight, and more inexpensive to manufacture, than the spring trip devices now in use.

These and other objects and advantages of the present invention will be apparent to those skilled in the art after a consideration of the following detailed description, taken in conjunction with the accompanying drawings, in which:

Figure 1 is a side view, partly in section, of a cultivator shovel mounting constructed according to the principles of the present invention.

Figure 2 is a sectional view taken generally along the line 2—2 of Figure 1.

Figure 3 is a fragmentary view, similar to Figure 1, showing the pivoted shovel-receiving foot piece or sleeve in a position of adjustment different than that shown in Figure 1.

Figure 4 is a view similar to Figure 3, showing the action of the spring device when the shovel encounters some obstruction and is tripped.

Figure 5 is a view taken generally along the line 5—5 of Figure 1, showing the preferred means for clamping the shank to a tool beam.

Figure 6 is a top view, showing the upper end of the shank and shank clamping means.

Referring now more particularly to Figure 1, the tool bar of a cultivator rig is indicated by the reference numeral 1 and, as best shown in Figure 5, has been illustrated as a rectangular bar. The latter supports one or more tools in the form of shovels each of which is mounted on a shank clamped to the tool bar 1. According to the principles of the present invention, I provide a hollow shank bar 5, preferably in the form of a tubular member, such as a short section of

2 pipe, open at both ends and having a bracket 6 secured, as by welding, to the lower portion of the shank 5. The bracket 6 has a portion 7 extending in depending relation below the lower end of the shank 5, this end being formed arcuately, as parts of a cylindrical surface. The lower depending portion 7 of the bracket 6 is apertured, as at 8, and receives a hardened wear resisting bushing 9 having an axial length slightly greater than the thickness of the bracket, as is best illustrated in Figure 2.

Pivotally mounted on the bracket 6 is a tool-receiving sleeve or foot piece indicated in its entirety by the reference numeral 11. This member preferably is in the form of a casting having a curved front surface 12 and an upper bifurcated section 13. The latter section forms a vertical slot 14 the opposite side walls of which are extended rearwardly to form a pair of lugs or extensions 16 and 17 (Figure 2). The opposite side walls 18 and 19 of the upper slotted portion 13 of the foot piece 12 are formed arcuately so as to fit against the arcuate surface 21 at the lower end of the tubular shank 5. These co-acting surfaces are arcuate about a center which is defined by a pair of apertures 22 and 23 formed in the side walls 18 and 19 and in which a pin 25 is disposed, being held therein preferably by a press fit. A shovel 26 of more or less conventional construction is fastened in place on the foot piece 11 against the arcuate front face 12 thereof by a bolt 28 which passes through an opening 29 in the foot piece 11.

A tension spring 31 is disposed within a tubular shank 5 and at its upper end receives a socket 32 having exterior grooves formed to receive the coils at the upper end of the spring and having a capped opening to receive an adjusting bolt 34, the head 35 of which bears against the upper end of a cap 36 seated, as best shown in Figure 1, on the upper end of the shank 5. The lower end of the spring 31 is formed with a hook 38 which receives a link 39. A second link 41 is connected at its upper end with the link 39 and at its lower end receives the pin 25. By tightening the adjusting bolt 34, it will be seen, particularly from Figure 1, that the foot piece 11 may be held in the socket 21 with the desired force by properly adjusting the bolt 34.

The bushing 9 is apertured to receive a clamping bolt 46 which serves as a pivot for pivotally connecting the foot piece 11 to the lower end of the shank bracket 6. As best shown in Figure 2, the bolt 46 passes through a pair of corrugated washers or blocks 47 and 48, the corrugations of which fit against companion corrugations 51 formed on the laterally outer sides of the foot piece lugs 16. The latter are provided with arcuate slots 53 dimensioned to receive the bolt 46 and the slots 53 are arcuate about the pin 25 as a center. The inside surfaces of the lugs 16 and 17 are flat and, as best shown in Figure 2, fit against the ends of the hardened wear resisting bushing 9.

Figure 2 shows the bolt 46 pulled up tight, with the corrugated washers 47 and 48 interengaged with the corrugations 51 on the foot piece lugs 16 and 17. In both Figures 1 and 2 the bolt 46 is in a central position of adjustment as regards the ends of the slots 53. If it should be desired to have the shovel 26 adjusted to a somewhat steeper angle, the bolt 46 is loosened sufficiently to permit the disengagement of the corrugated washers 47 and 48 from the corrugations 51 on the lugs 16 and 17. The foot piece 11 may then be swung in one direction or the other about the axis defined by the pin 25, the arcuate slots 53 accommodating the swinging of the foot piece 11 relative to the bolt 46 which, of course, remains in its position with the shank bracket 6. Figure 3 shows the position of the foot piece 11 for somewhat decreased suck, in which position the upper ends of the slots 53 receive a bolt 8. Then by engaging the corrugated washers 47 and 48 with the sides of the lugs 16 and 17 and then tightening the bolt 46, the foot piece 11 is held in its new position of adjustment. It is to be noted that in making this adjustment no change is made as regards the position of the pin 25 and foot piece pivot 46 relative to the shank or the spring 31. If the shovel should encounter an obstruction, such as a stone, stump or the like, in operation, the spring resistance is overcome and the shovel and foot piece 11 swings backwardly about the bolt 46 as a pivot. In doing so the resulting downward movement of the pin 25 extends the spring 31. As best shown in Figure 1, the relation of the two pivots 25 and 46 with respect to the axis of the spring 31 is such that when the foot piece 11 swings rearwardly the effective lever arm of the spring 31 is reduced, as shown in Figure 4, thus providing in effect a spring trip in which the greatest resistance to displacement of the shovel and foot piece is encountered when the parts are in their normal operating position (Figure 1 and Figure 3), but when the initial resistance of the spring 31 is overcome, the resistance to rearward movement of the shovel under such conditions is reduced proportionately to the reduction in the effective length of the lever arm or moment arm of the spring 31. There is, of course, sufficient force available to return the shovel to its operating position (Figure 1) after the obstruction has been cleared.

New and improved clamping means, particularly adapted to cooperate with the tubular shank 5, is shown in Figures 1, 5 and 6. Referring now to these figures, the tool bar 1 is apertured, as at 61 to provide openings for receiving a clamping U-bolt 62. The U-bolt encircles the shank 5, preferably a short distance below the cap 36, the diameter of which is the same or less than the diameter of the shank 5 so that the latter may be moved upwardly and downwardly, and into and out of the U-bolt 62. A pair of clamping blocks 63 and 64 are provided, these blocks being apertured, as at 66 and 67, to receive the legs of the U-bolt 62. Each of the blocks 63 and 64 is beveled, as at 68, so as to fit snugly against the adjacent portions of the shank 5 so that a line extending from each beveled section 68 to the axis of the shank 5 makes an angle of about 45 degrees with respect to a vertical transverse plane passing through said axis. Additionally, each of the clamping blocks 63 and 64 is provided with upper and lower overhanging shoulders 71 and 72 which are spaced apart the width of the tool bar 1, as best shown in Figure 5.

The action of the above described clamping means is substantially as follows. When the nuts 75 on the threaded ends 76 of the U-bolt 62 are tightened, the shank 5 is pulled toward the tool bar 1 and against the beveled sections 68 of the clamping blocks 63 and 64. Due to the above mentioned angular relations, which are shown best in Figure 6, as the nuts are tightened there are laterally outwardly directed components of force acting to spread apart the blocks 63 and 64. This not only forces the openings 66 and 67 against the legs of the U-bolt but, additionally, forces the sides of the U-bolt against the openings 61 in the tool bar through which the legs of the U-bolt 62 pass. This provides a very secure attachment for the shank 5 which secures the parts firmly and rigidly to the tool bar 1. The shoulders 71 and 72 which overhang the upper and lower edges of the tool bar 1 are thus made effective to prevent any angular displacement of the shank 5, as in a rearward direction under the pressure of the soil against the shovel 26.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In an agricultural implement, a tubular shank, a bracket fixed thereto in depending relation with respect to the lower end of said shank and having an opening therein, a tool-receiving foot piece having a slotted rearwardly extending part, a pivot member passing through said slot and said opening in said bracket, said foot piece adapted to pivot about said pivot member, spring means disposed within said tubular shank and connecting the latter and said foot piece, and means adjustably fixing the position of said pivot means in the slot in said foot piece for adjusting the position of the latter relative to said shank.

2. In an agricultural implement, a tool standard having a bracket with an aperture therein, a wear resisting bushing disposed in snug fitting relation in said aperture and having a length slightly in excess of the thickness of said bracket, a tool-receiving part having a pair of laterally spaced lugs adapted to embrace said bracket and receive said bushing between said lugs, the latter being apertured, and clamping means passing through said last mentioned apertures and said bushing for clamping said lugs to said bushing for pivotally connecting said tool-receiving member to said bracket.

3. The invention set forth in claim 6, further characterized by spring means connected between said tool-receiving member and said standard for yieldably resisting movement of said tool-receiving member relative to said standard.

4. In an agricultural implement, a tubular standard, a bracket fixed thereto, a pivot member carried by said bracket, a foot piece, spring means disposed within said tubular standard and connected thereto at one end, means including a pin connecting the other end of said spring with said foot piece, the latter and said standard having abutting surfaces formed generally arcuate about the axis defined by said pin, and slotted lugs carried by said foot piece for receiving said pivot member carried by the bracket, the slots in said lug being arcuate about the axis defined by said pin, and means for adjustably fixing the position of said pivot member in the slots in said lugs so as to accommodate disposing said foot piece in different positions relative to said standard generally about the axis defined by said pin.

5. In an agricultural implement, a tool-receiving foot piece having a bifurcated portion at its upper end, the side walls of which are apertured to receive a pivot pin and the upper portions of said side walls being arcuate about the axis defined by said pin, said side walls being extended rearwardly to form attaching lugs, and said lugs having arcuate slots therein, said slots being arcuate about the axis defined by said pin-receiving openings in said side walls.

6. In an agricultural implement, a tool standard having an arcuate section at one end, a bracket carried by said standard adjacent said arcuate section, a tool-receiving member having an arcuate section complementary with respect to said first mentioned arcuate section and adapted to seat in the latter arcuate section and pivot means disposed on said member substantially at the center of curvature of the arcuate section of said member, pivot means connecting the tool-receiving member with said bracket, means on said bracket and member providing for shifting said last mentioned pivot means to different positions relative to said foot piece about said center of curvature, and spring means acting between said tool standard and said first pivot means for yieldably resisting movement of said foot piece relative to said standard about the axis of said adjustable pivot means.

7. In an agricultural implement, an upright tool standard having an arcuate portion at one end thereof; a foot piece having an arcuate portion complementary to the standard arcuate portion, said portions being interfitted to provide for relative angular movement between the standard and foot piece; yieldable means interconnected between the standard and foot piece and yieldably maintaining the interfit between the two; a pair of lugs, one fixed on the standard and the other fixed on the foot piece, and projecting in side-by-side relationship in laterally spaced relation to the arcuate portions, one lug having an aperture therein and the other having a slot formed generally about the center of the arcuate portions; and a releasable pivot member passed through said slot and aperture and pivotally interconnecting the lugs, so that the foot piece may move angularly about the pivot member to separate the arcuate portions and so that the foot piece may be adjusted angularly about the arcuate portions upon release of the pivot member.

FRANK T. COURT.

REFERENCES CITED

The following references are of record in the file of this patent:

UNITED STATES PATENTS

| Number | Name | Date |
| --- | --- | --- |
| 394,283 | Mendenhall | Dec. 11, 1888 |
| 407,273 | Allstatter | July 16, 1889 |
| 554,892 | McFall | Feb. 18, 1896 |
| 602,430 | Corcoran | Apr. 19, 1898 |
| 637,390 | Howe et al. | Nov. 21, 1899 |
| 894,787 | Waterman | July 28, 1908 |
| 1,207,162 | Grayson | Dec. 5, 1916 |
| 1,410,084 | Viar | Mar. 21, 1922 |
| 2,358,531 | Orendorf | Sept. 19, 1944 |

Certificate of Correction

May 2, 1950

Patent No. 2,506,443

FRANK T. COURT

It is hereby certified that error appears in the printed specification of the above numbered patent requiring correction as follows:

Column 4, line 68, for the claim reference numeral "6" read *2*; and that the said Letters Patent should be read with this correction therein that the same may conform to the record of the case in the Patent Office.

Signed and sealed this 25th day of July, A. D. 1950.

[SEAL]

THOMAS F. MURPHY,
*Assistant Commissioner of Patents.*